United States Patent [19]

Colas

[11] 3,868,482

[45] Feb. 25, 1975

[54] LINE SCANNING SYSTEM IN AN EXCHANGE CENTER

[75] Inventor: Jean Daniel Colas, Vence, France

[73] Assignee: International Business Machines Corporation, Armonk, N.Y.

[22] Filed: Dec. 21, 1972

[21] Appl. No.: 317,449

[30] Foreign Application Priority Data

Dec. 29, 1971 France ............................ 71.47912

[52] U.S. Cl. ......................... 179/18 FF, 179/18 AB

[51] Int. Cl. ........................................... H04m 3/22

[58] Field of Search ........ 179/18 ES, 18 FG, 18 FF, 179/18 AB

[56] References Cited

UNITED STATES PATENTS

| | | | |
|---|---|---|---|
| 3,532,830 | 10/1970 | Wirsing | 179/18 AB |
| 3,626,108 | 12/1971 | Oswald et al. | 179/18 ES |
| 3,692,944 | 9/1972 | Durteste et al. | 179/18 FF |
| 3,715,515 | 2/1973 | Stirling et al. | 179/18 FF |

*Primary Examiner*—Thomas W. Brown

[57] ABSTRACT

Apparatus and method for collecting and processing line state information. The apparatus includes a line scanner, storages for present line state, former line state and line active-idle status, comparison means to detect change in line state and selector means to transmit the detected changes alternatively for lines of active or idle status, and separate queus under the control of an active-idle line status input control for storing the results of the change detector according to the status of the lines being scanned. The apparatus facilitates carrying out of line state change collecting and processing method wherein the change information is processed in a manner which gives priority to the information concerning active lines.

8 Claims, 9 Drawing Figures

NOTE: EXPIRATION OF TIME FOR PERIOD T CAUSES INTERRUPT AND RETURN TO BEGINNING OF A SCAN ON I SCAN IN ACCORDANCE WITH FIG. 2

LINE SCANNING SYSTEM IN AN EXCHANGE CENTER

BACKGROUND OF THE INVENTION

1. Field of the Invention

This invention relates to exchange centers and particularly to the ones provided with a computer. Namely, an object of this invention is to provide a method for collecting and processing information resulting from line scanning.

2. Description of the Prior Art

In exchange centers provided with a computer, the lines are periodically tested to check their electrical state; in most cases, only two states are possible, for example, the "under-voltage" (ON) state and the "out-of-voltage" (OFF) state, but this invention is not restricted to this case. U.S. Pat. No. 3,513,263 and IBM Journal of Research and Development, Vol. 13, No. 4 (July 1969) pages 408 to 437 are illustrative of the prior art. The results of the tests are recorded into a memory. From these results, and possibly from other tests, measurements or calculations, the computer establishes the existence of "events"; an event can be, for example, a handset being taken off, a telephone number emitted by a telephone dial, the end of a delay ... etc. These events, after being found, are processed, i.e. the computer determines the actions to be taken; for example, searching for a connecting path between a calling line and a called line, supplying a tone, etc. Assigning "status" to the lines or changing said status is included among the actions controlled by the computer. The status of a line shows a relation between said line and the assembly formed by the exchange center and the other lines; among the possible status, one can mention: the rest line, the calling line, the called line, the talk line. The status of a line is not necessarily linked to its physical state but can show a logical relation only. Thus, the state of a called line which has not yet answered the call does not differ from the state of a line at rest, but it has a different status.

The states of the lines detected by the system, and their status assigned by said system, are recorded into a memory section. Any detected change of state should be processed by the computer, but the processing operation does not immediately follow the detection; in effect, the arithmetical and logical circuits of the computer can process only one change of state at a time and it would be too complicated to wait for the result of the test of the previous line to be processed before testing the state of a line. A solution is to test all the lines and to record the identity of the line having changed of state into memory sections which will be called "change words", then to process the recorded change information one after the other. The change words containing the information waiting to be processed form a "queue". Within the time intevals allowed to the computer to process the information, the computer successively processes each of the words of the queue, beginning with the one introduced first into the queue. The processing operation includes the reading of the information contained in the memory section indicating a change of state, the reading of the other information concerning the line (for example: changes of previously recorded states, delay elapsed from these recordings, present status of the line, etc.) or concerning other elements of the exchange center (for example: identity of another line already connected to the line, the change of state of which has been recorded), the carrying out of mathematical or logical operations on this information; and, at last, if necessary, the supply of a connecting order to the switching circuits. After processing is completed, the result of the operations (noting an event or changing status) is recorded into an appropriate memory section and the word is removed from the queue.

The time interval between two scannings is approximately equal to the time required for processing an event and it can happen that some words of the queue are not yet processed while a new scanning is started; however, the results of this new scanning are recorded into other words which take place into the queue following the ones already waiting to be processed. These new words can even contain information concerning lines for which already exists information contained in the old words which are not yet processed; this does not affect the operation of the system, the successive changes of state of a same line always processed in the order in which they appear.

However, a limitation is applied by the maximum number of words which can be introduced into the queue. Should this number be reached, new changes of state cannot be recorded and, therefore, will not be processed; it is obvious that this can seriously disturb the operation of the system, for example, in the case these changes of state indicate dialing pulses supplied by the calling dial.

The purpose of this invention is to eliminate or to reduce such a risk considerably.

SUMMARY OF THE INVENTION

The main object of this invention is to provide a process for recording and processing information of changes of states detected on scanning the state of the lines in an exchange center provided with a computer, in which the risk of losing an information essential for operating the system is reduced to a minimum.

Another object of this invention is to provide a device for carrying out this process.

The principle of the invention is based on the fact that the series of state changes which lead to the creation of a call can be classified into two categories:

1st. The changes of state due to the initial application of voltage to the calling line; in the telephone exchange centers, this application of voltage corresponds to the calling handset being taken off-hook.

2nd. The successive changes of state due to the dialing operation performed on the calling dial.

It is the changes of state of the second category which may cause the lines to become saturated. These changes of state appear at times which cannot be controlled, neither by the operators nor by the system, and it is not possible to neglect them without taking the risk of errors. Therefore, it is better to limit the number of lines which can introduce, into the queue, information indicating state changes of the second category. Now, the only lines which are in this case are the ones for which the state change of the first category (off-hook) has been processed. But, it is possible, without great disadvantages, not to process this state change, i.e. not to cause the operations leading to the connection of the calling set to the call receiving elements and to the supply of the dialing invitation tone to said calling set, to be performed. If the calling set is not hung up, the state change will be detected again on the following scanning and, if the risks of saturation have disappeared, this state change could be processed. This will lead to a delay but not to an error.

In the following, the lines at rest and the lines to which voltage has just been applied but are not yet connected to the call receiving elements will be called "idle lines", the other lines, i.e. namely the calling lines and the talk lines will be called "active lines".

The process of this invention enables limiting the number of active lines so as to reduce the risks of not using a state change. It is characterized as follows:

1. Two queues are formed, the first one (which will be called "queue of the active lines") is constituted of words recording the state changes of the active lines, the second one (which will be called "queue of the idle lines") is constituted of words recording the state changes of idle lines.

2. The state change information recorded into the queue of the active lines has priority to be processed. In the preferred embodiment of the invention, this priority is absolute, i.e. a state change information recorded in the queue of the idle lines can be accepted by the processing elements only if there is no state change information in the queue of the active lines. It is understood that the processing "elements" involved here can be either physical elements, or programs according to the arrangement of the computer.

These and other objects, advantages and features of the present invention will become more readily apparent from the following specification when taken in conjunction with the drawings.

DESCRIPTION OF PREFERRED EMBODIMENTS

Figure 1:
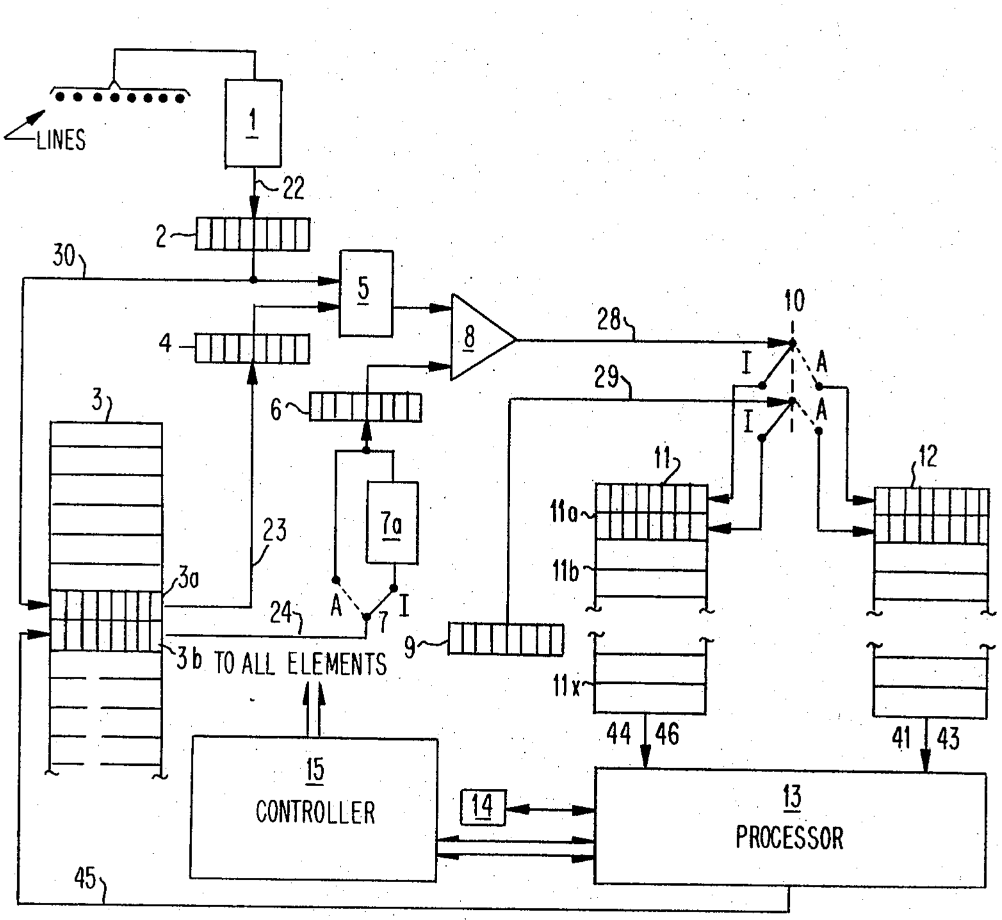
FIG. 1 illustrates a section of a telephone exchange center to which the process of the invention can be applied.

The system shown in FIG. 1 includes:

*A device for testing lines* 1

This device can be of a type known in the art. the device shown on the figure scans the lines by groups of 8 and supplies a signal of 8 bits in parallel, each bit corresponding to a line of the group and having value 1 when the line is under voltage and value 0 on the contrary. It is preferred to scan the lines by groups to save time but it could be possible without departing from the scope of the invention, to use a device scanning the lines one by one.

*A register of new states* 2 constituted by a group of 8 binary memory positions able to receive the signals issued from scanning device 1.

*A line table* 3.

This table is constituted by an assembly of memory sections each corresponding to one of the line groups indicated above. Each section includes two parts:

a. a state word, composed of 8 bits: each of these bits corresponds to one of the 8 lines of the group and can be modified as it will be explained later, when the detection of a state by the scanning device is taken into account.

b. a status word also composed of 8 bits, each corresponding to one of the 8 lines of the group: each bit takes value 0 if the corresponding line is considered as an idle line and value 1 if it is considered as an active line. This status word indicates only the main characteristic of the status (active or idle line). The other information specifying the status (for example, for an active line: calling line, talk line, etc...) are recorded into other memory sections which are not shown, the complete knowledge of the status being not necessary for carrying out the process of this invention.

In FIG. 1, the state word and the status word corresponding to one of the groups of 8 lines are referenced 3*a* and 3*b* respectively.

*A register of old states* 4 constituted by a group of 8 binary memory positions and able to receive from line table 3, the state word corresponding to the group scanned by device 1.

*A comparator* 5 comparing bit per bit, in parallel, the contents of the register of new states 2 and the contents of the register of old states 4; this comparator can be constituted by a set of EXCLUSIVE OR circuits, each of which supplies a bit 0 when the compared bits are identical and a bit 1 when they are different.

*A mask register* 6 constituted by a group of 8 binary memory positions and able to receive either the contents of the status word corresponding to the scanned line group or the complement of this contents, according to the position of commutator 7.

*A commutator* 7 transmitting the contents of the status word to mask register 6, either directly or through inverter 7*a*.

*A gate* 8 transmitting the signals supplied by comparator 5 only for the lines to which corresponds a bit 1 in mask register 6.

*An address register* 9 constituted by a group of binary memory positions and provided for recording an address identifying a group of 8 lines to be scanned or on scanning, and also identifying the location, in line table 3, of the section corresponding to this group. It has been assumed that the number of groups is limited to 256; therefore, address register 9 comprises 8 positions.

*A commutator* 10 transmitting the series of signals issued from gate 8 and from address register 9, either to the queue of idle lines 11, or to the queue of active lines 12.

*A queue of idle lines* 11 constituted by a set of memory sections. Each section includes two parts, the first one called "change word", able to receive the signals issued from gate 8, the second one called "address word" able to receive the address of the corresponding group of lines. The information is introduced in the first section referenced 11*a*. As explained later, the information contained in the sections, on operation, are progressively shifted until they reach last section 11*x* from where they are eliminated after processing.

*A queue of active lines* 12 constituted as queue 11; however, the number of sections can be different.

*A device for processing the results of the scanning operation* 13; this device can read the contents of the last section of the queues 11 and 12, and, in accordance with a program, issue operating signals which are supplied to other elements of the system shown or not on FIG. 1.

*A busy idle line queue indicator* 14, which can have either value 0 (not full) or 1 (full).

*A control device* 15 connected to the various elements indicated above the state of which can be tested by said control device and to which it can deliver orders. (The connections are not shown to simplify the drawing). This control device can be a set of circuits especially constructed to carry out the process. It can be also a standard computer of the industrial type, i.e. able to receive information resulting from tests of physical states and to supply orders. A computer which is well adapted for process control applications, for example an IBM 1130 Computing System or an IBM 1800 Data Acquisition and Control System, can be utilized to embody elements 13 and 15. The other elements shown on FIG. 1 can be input-output devices provided outside the computer, however some of them, and in particular, memory assemblies 3, 11, 12 and registers 2, 4, 6, 9 can be internal elements of the computer. In addition, to simplify the drawing, commutators 7 and 9 have been shown as electromechanical commutators, but it is obvious that they can be constituted by electronic commutators, or by sets of logic circuits as AND circuits to which the information to be directed is supplied simultaneously with the "gate" information. These differences in the various embodiments do not modify the principle of the process.

Now, the operation of the system will be described by considering the various phases of the process and the various steps in these phases.

The operations to be performed include the scanning phases and the result processing phases. The duration of the scanning phases is fixed. The duration of the result processing phases depends on the number of results to be processed and of the nature of the processing. The scanning phases are started at regular intervals by device 15. They stop processing by device 13 which starts again after the operation in progress has been stopped.

Figure 2:
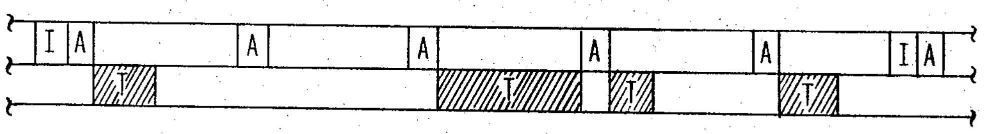
FIG. 2 is a timing diagram of the various operating phases of this exchange center.

The timing diagram of FIG. 2 shows the distribution of the phases in time. Letter A refers to the scanning phases of the active lines, letter I refers to the scanning periods of the idle lines and letter T refers to the processing phases. As it can be seen, the active lines are scanned more often than the idle lines. This difference in frequency is not caused by the principle of the invention, but it enables to take a better account of the frequency of the state changes to be processed. "Scanning" the idle or active lines should not be understood as only testing the state of the lines but also as taking into account the results of the test; in effect, during the scanning periods all the lines are tested, and it is mask register 6 which enables retention of only the result of the test of the active lines (during period A) or only the one of the idle lines (during period I).

To avoid confusing the references of the various steps of the process with the references of the system elements, said steps bear numbers exceeding 20, numbers 21 to 40 being allowed to the scanning phases and the numbers exceeding 40, to the processing phases. In FIG. 1, the transfers between elements are represented as lines bearing the same reference numbers as the steps during which said transfers are performed. However, to simplify the figure, the transfers of information to or from control device 15 are not shown in detail.

Figures 3, 3A:
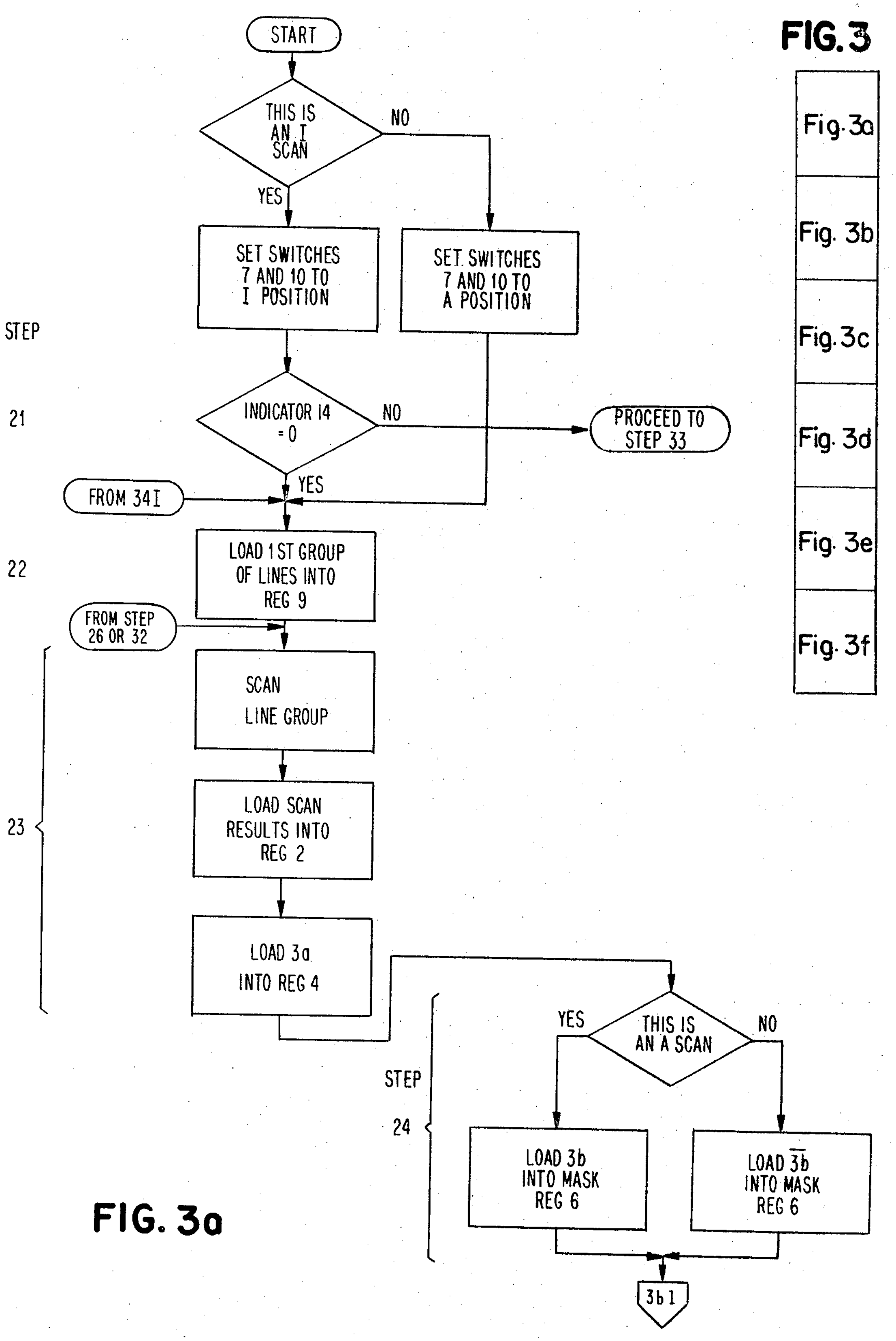
FIGS. 3*a*—3*f* comprise a flow diagram illustrating operation of the apparatus of FIG. 1 in accordance with a preferred embodiment of the process of the invention.
Figure 3B:
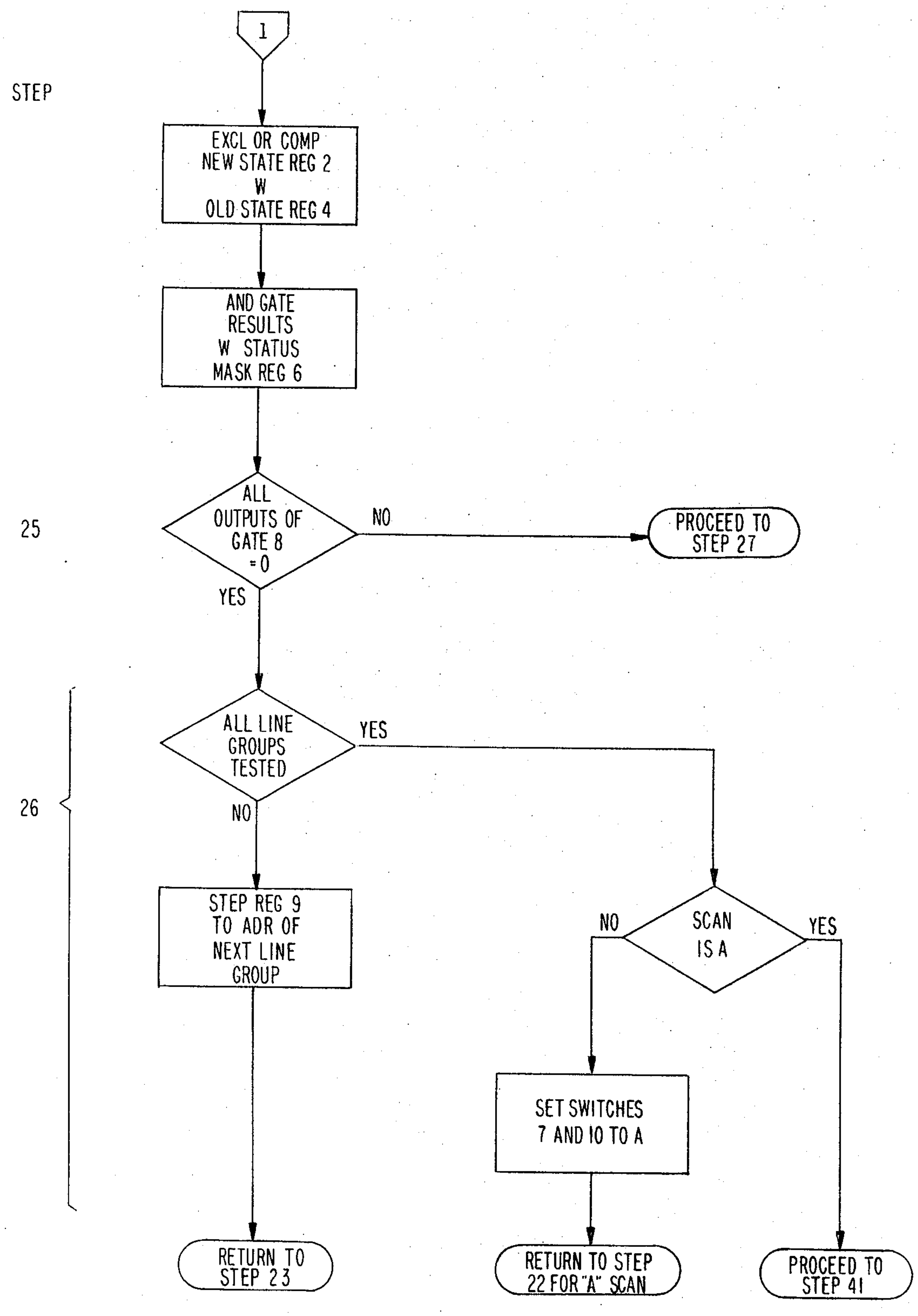
Figure 3C:
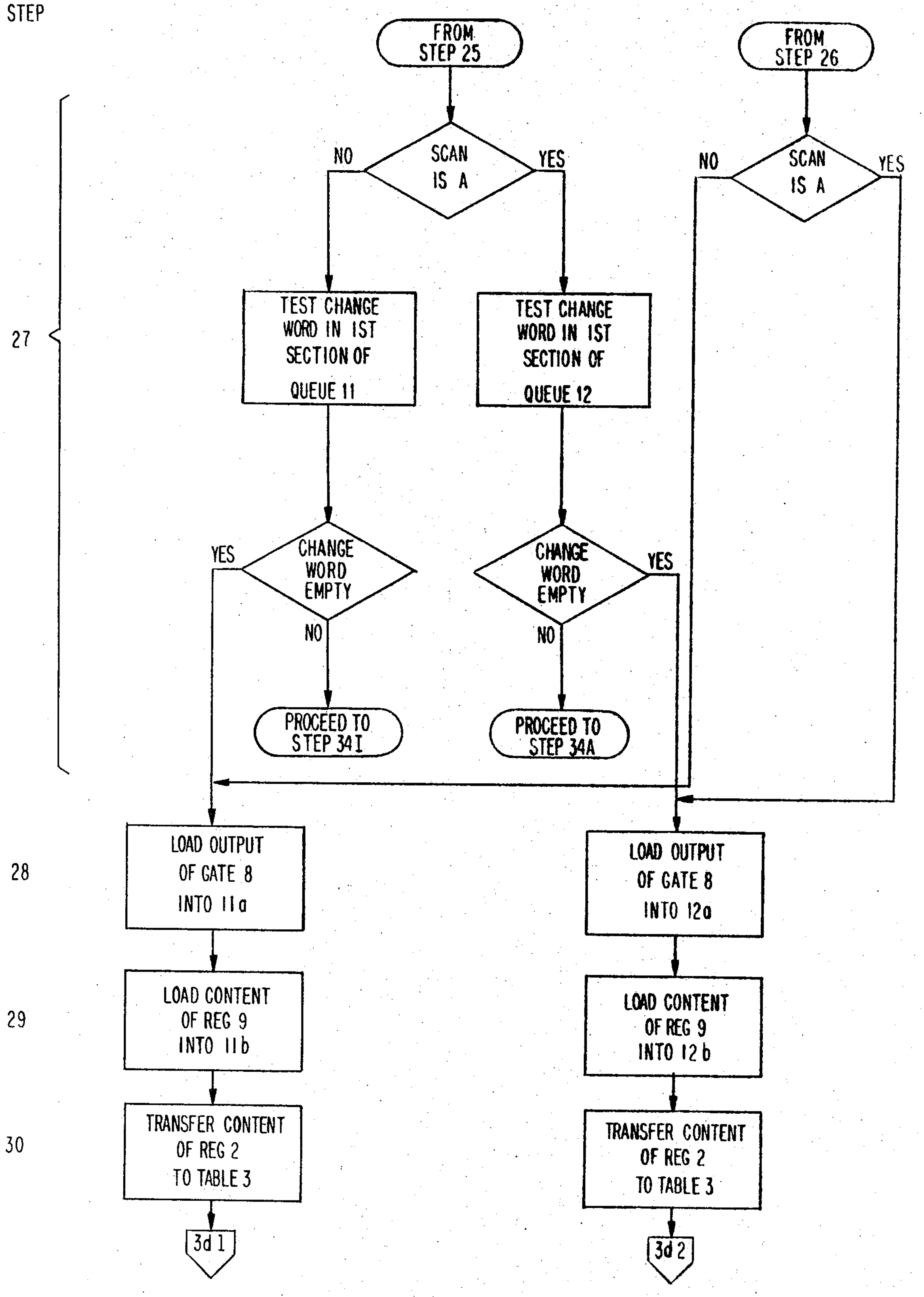
Figure 3D:
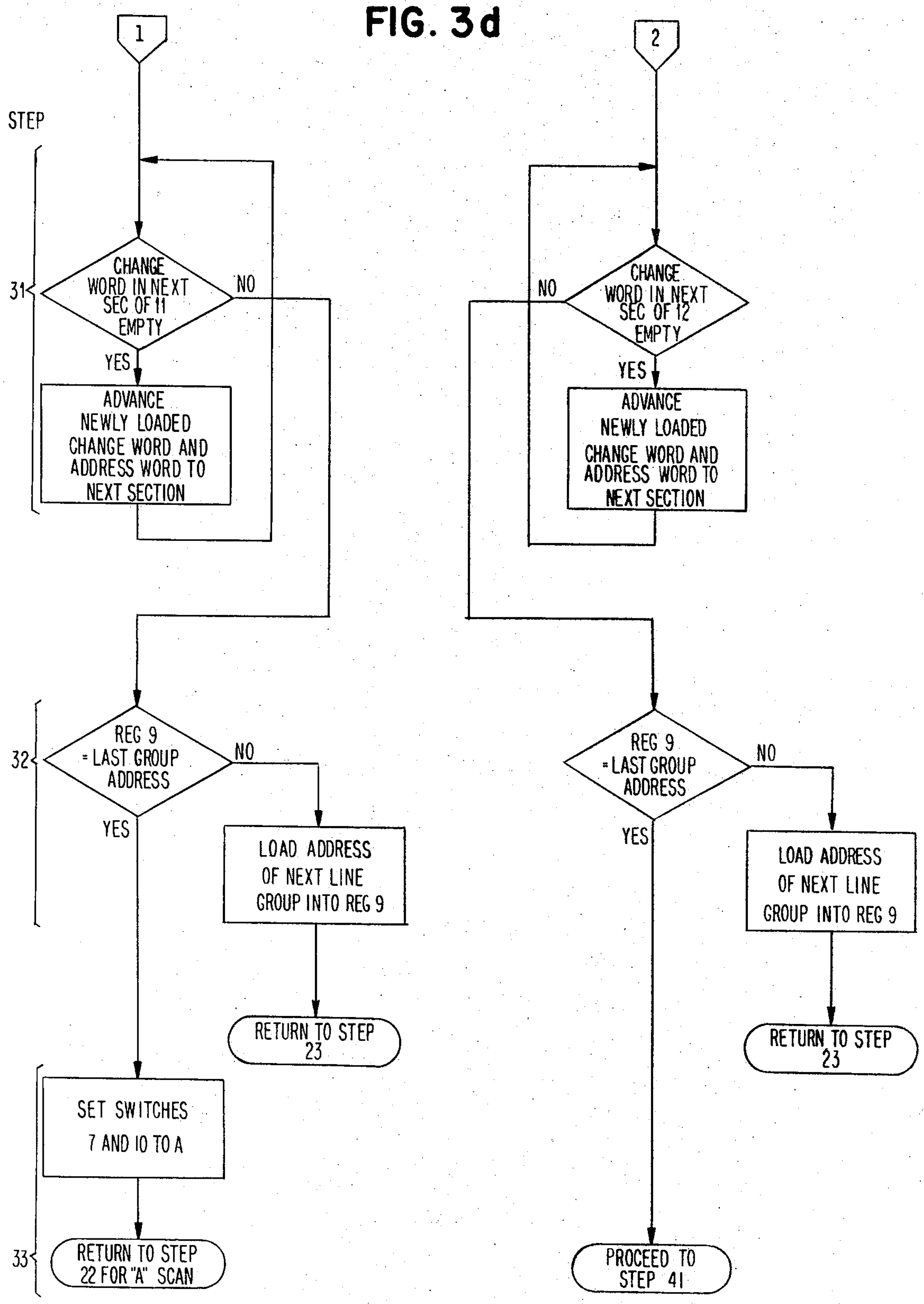
Figure 3E:
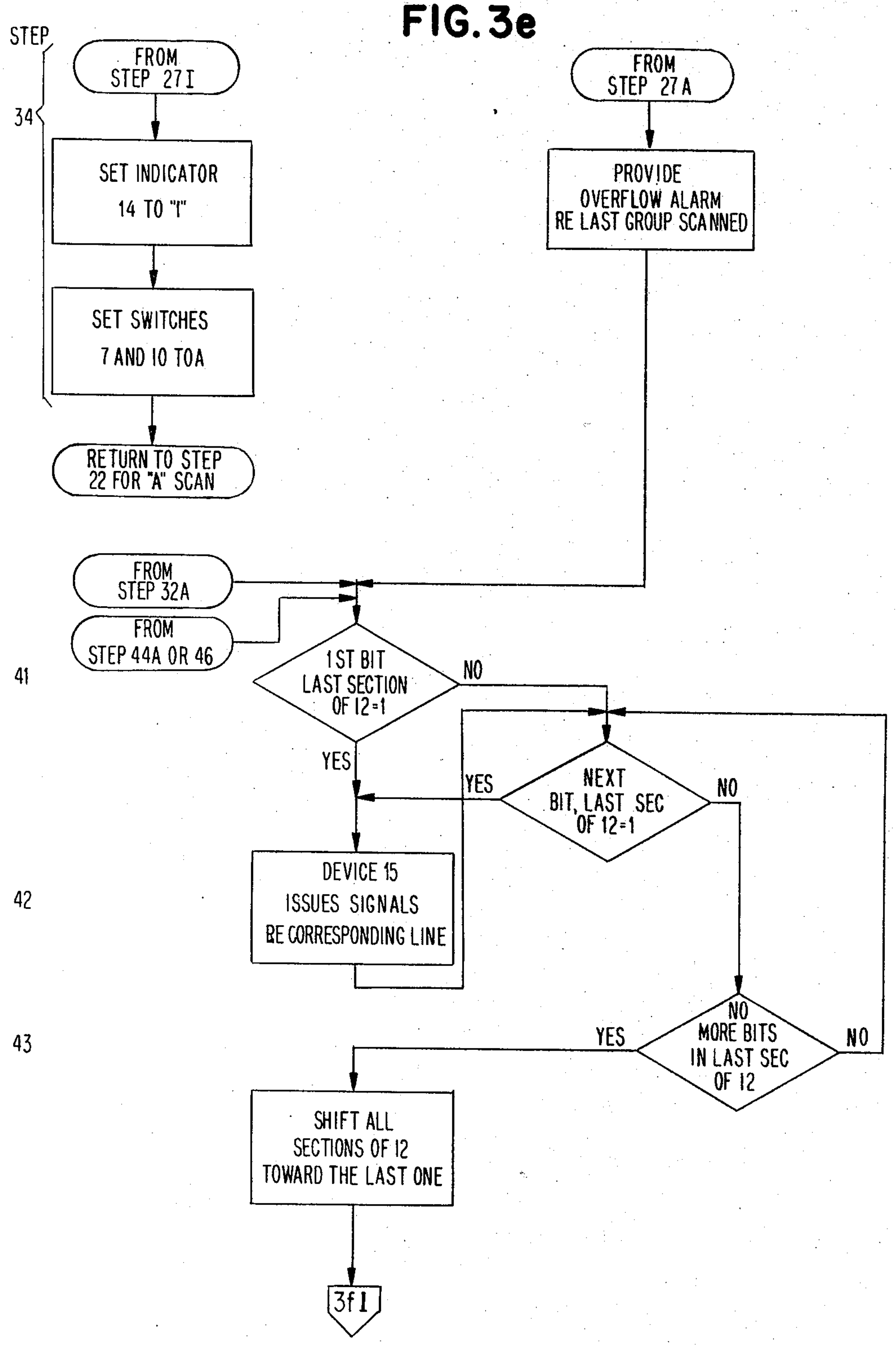
Figure 3F:
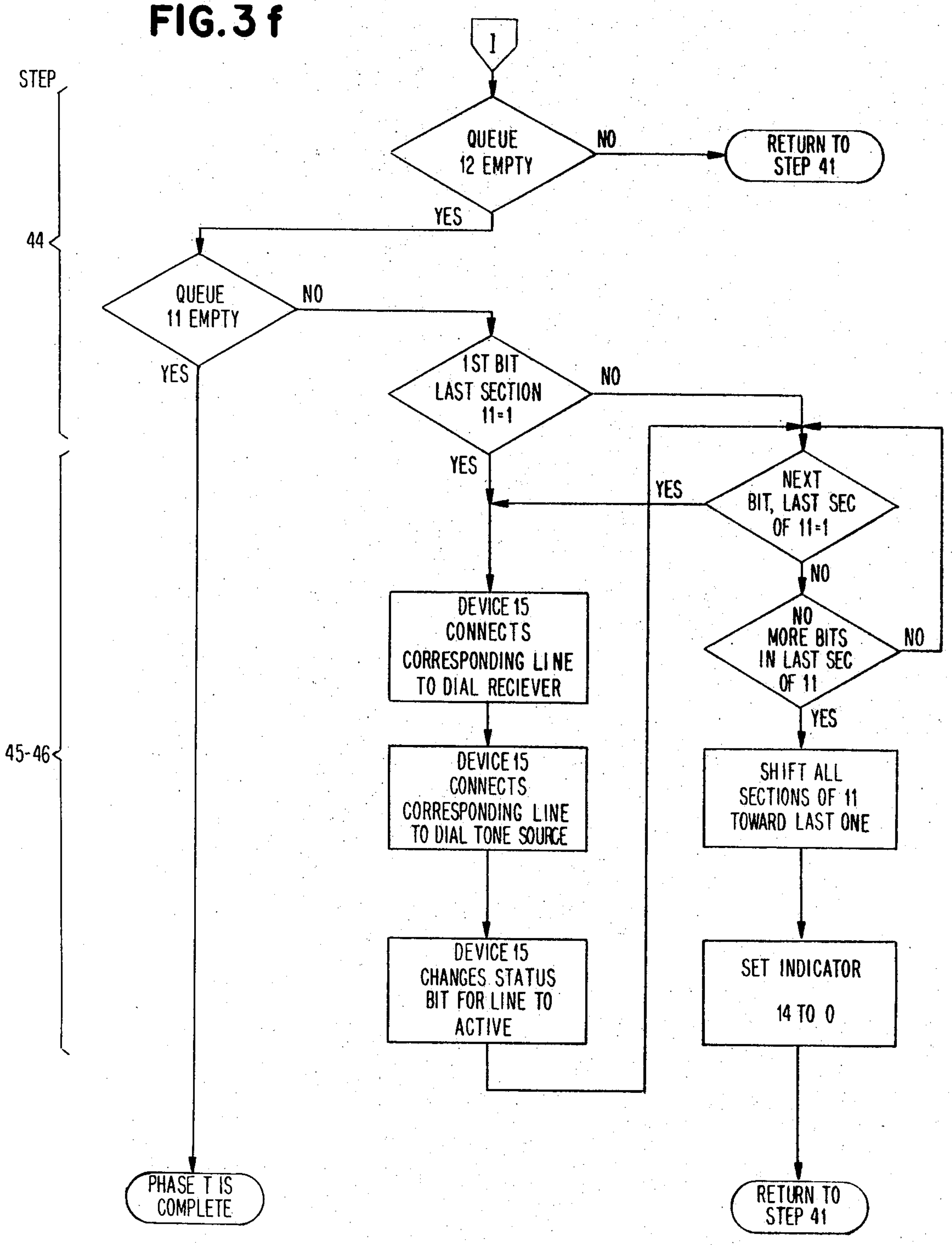

A scanning phase and a processing phase will be successively described. FIG. 3 shows a flow diagram illustrative of this operation, keyed to the steps set forth in the ensuing description. In general, no distinction will be made in the description between the active line scanning and the idle line scanning, the operation being the same in both cases, except for the routing applied by commutators 7 and 10. In FIG. 1, these commutators are shown in the positions "I" in which they are set during the idle line scanning periods; during the active line scanning period, they are set in the opposed positions "A"; switching is controlled by device 15.

*SCANNING PHASE*

It is assumed that at the beginning of the phase, some lines are active and some other ones are idle; the information about this characteristic of the status of the lines is supplied by the status words such as *3b*. The bits of the state words such as *3a* indicate the result of the test performed on the corresponding line on last scanning A if the line was active during this scanning or during last scanning I in the opposite case.

As controlled by device 15, the following steps are performed:

21. Control device 15, for a scanning I, tests the state of indicator 14; if its value is 0, proceed to step 22. If its value is 1, the scanning operation is not performed and proceed to step 33. For a scanning A, device 15 begins directly at step 22.

22. Control device 15 provides the address of the first group of lines to be scanned into address register 9.

23. Test device 1 tests the group of lines and the results of the test are introduced into register of new states 2. The contents of the state word corresponding to the tested group is introduced into register of old states 4.

24. The contents of the status word corresponding to the tested group if commutator 7 is in position A or the complement of this contents (if commutator 7 is in position I), is introduced into mask register 6.

It is to be noted that the order of steps 23 and 24 can be reversed and that said steps 23 and 24 can even be carried out in parallel if the arrangement of control device 15 enables such an operation. At the end of step 24, register 2 contains the indication of the new states of the tested lines and register 4 contains the indication of the old states. The outputs of comparator 5 corresponding to the lines which changed of state are at level 1, the ones corresponding to the lines which did not change of state are at level 0. The outputs of gate 8 are at level 0 for the lines to which corresponds a 0 in mask register 6; they are at the same level as the corresponding outputs of comparator 5 for the others. In other words, gate 8 only transmits the state change information corresponding to the lines for which mask register 6 contains a 1.

The process is carried on as follows:

25. The output signals of gate 8 are read by device 15. If these signals are all zeros, proceed to next step 26, if not, proceed to step 27.

26. The contents of address register 9 is read. If the address it contains is the address of the last group of lines to be tested, the scanning phase is completed and proceed to the next operating phases of the system. If not, the address is replaced by the address of the next group of lines and return to step 23.

27. The contents of the "change word" of the first section of queue 11 (in periods I) or the contents of the change word of the first section of queue 12 (in periods A) is tested. If this change word is empty, i.e., it contains only zeros, proceed to step 28, if not proceed to step 34.

a. *Case where the change word of the first section of the queue is empty*

28. The output signals of gate 8 are introduced into the change word of said first section.

29. The contents of address register 9 is introduced into the address word of this same section.

30. The contents of register of new states 2 is transferred into the state word of table 3 corresponding to the tested group; it replaces the previous state word.

(the order of steps 28 to 30 can be changed)

31. The contents of the change word of the second section of the queue is tested. If this word is empty, the whole contents of the first section (change word and address word) is transferred to the second section. Then, the third section is tested, and the transfers are carried out step by step until a non-empty section is tested, or until the information are transferred into the last section of the queue.

32. The contents of address register 9 is read. If the address is not the address of the last group too be tested, it is replaced by the one of the next group and one returns to step 23. If the address contained in it is the address of the last group of lines to be tested, proceed to the next step.

33. The scanning phase is completed and device 15 controls another scanning phase or enables again the processing by device 13.

b. *Case where the change word of the first section of the queue is not empty.*

34. The processing depends whether a scanning of the active lines or of the idle lines is carried out.

If scanning of the active lines is carried out, it is not possible to use the state change information transmitted by gate 8. Thus, information necessary for a good operation can be lost. Then, the operations the program of which has been prepared for such a case, are carried out. According to the systems and to the information recorded at this time in the various elements of the system (for example, the complete status of the lines), these operations can be, for example:

-warning the operator,

-supplying a dissuasion tone to the lines the state change of which cannot be used, -disconnecting these lines.

If, on the contrary, a scanning of the idle lines is performed, information 1 is supplied into indicator 14, and scanning is stopped. Everything is carried out as if the lines of the groups were not tested. The contents of the state word in table 3 is not modified and could be again compared during another period I with the information which will be supplied by scanning device 1 into register 2.

*PROCESSING PHASE*

During the processing phase, the information contained in queues 11 and 12 are analysed, the information contained in queue 12 (active line queue) being analysed first. The analysis includes the following steps:

41. The bits of the change word of the last section of queue 12 are read in series. If no bit 1 is detected, proceed to step 44. If a bit 1 is detected, proceed to step 42.

42. The information concerning the line corresponding to the detected bit 1 (information contained in table 3 or in other elements of the system which are not shown), as well as other possible information, are read, processed and the appropriate signals (information or orders) are issued.

43. The change word of the last section of queue 12 is read again. If it contains only zeros, all the other sections are shifted toward the last one and one returns to step 41. If a bit 1 is detected, one returns to step 42.

44. If during a step 41, only zeros are detected, queue 12 is empty. The bits of the change word of the last section of queue 11 are read in series. If no bit 1 is detected, processing phase T is completed and proceed to the next phases of the analysis. If a bit 1 is detected, proceed to step 45.

45. The detection of a bit 1 indicates that the corresponding line has changed of state. Since it is an idle line, this change of state indicates that the subscriber has just lift the handset. Device 13 performs the appropriate processings which involve namely the following results:

a. The connection of the line to the appropriate elements to receive dialing signals, b. The supplying of the dialing invitation tone, c. The supplying of a signal to change, in the status word, the value of the bit corresponding to the line having changed of state. Then, this line becomes "active" and its further state changes can be taken into account only in periods A. If the system is temporarily unable to connect an element to this line, processing (*a*), (*b*), (*c*) indicated above are not performed and the line remains idle. It will be discovered again on a further scanning I.

46. The change word of the last section of queue 11 is read again. If it contains only zeros, all the other sections are shifted toward the last one, information 0 is supplied into indicator 14 and one returns to step 41. If a bit 1 is detected, one returns to step 45.

The processing phase is completed when, on a step 44, no bit 1 is detected. Then, both queues are empty. The processing phases are started again by device 15 at the end of a scanning operation if at least, one of the two queues is no longer empty.

It is possible, without departing from the scope of this invention, to apply various modifications to the system of the invention. Namely, it is possible:

-to test, during the scanning periods, only a part of the set of line groups,

-to attenuate the absolute priority rule of queue 12, by for example, processing the information of a word of queue 11 when the latter is full, even if some information of queue 12 remain to be processed, provided that the latter contains a certain number of empty words, -and more generally, to carry out all additions, annulations or modifications which can come to the mind of those skilled in the art.

While the invention has been particularly shown and described with reference to the preferred embodiment thereof, it will be understood by those skilled in the art that various changes in form and details may be made therein without departing from the spirit and scope of the invention.

What is claimed is:

1. A method for collecting and processing information relating to the change of states of the lines provided in an exchange center, characterized in that:

the lines are classifeid in two classes (active lines and idle lines), a change of class being possible during the processing operation;

the lines are scanned and tested for state change in active lines in scanning phases recurrent at regular intervals, and the lines are scanned and tested for state change in idle lines in scanning periods recurrent at regular intervals;

the state change information waiting for processing and relating to the active lines and the state change information relating to the idle lines are stored into two different assemblies of memory positions, one said assembly defining a queue of active lines and the other defining a queue of idle lines, scanning periods being terminated without completion when said queue of idle lines is full, at least said assembly for active lines having capability to buffer more than one change indication for the same line, and the information is processed in accordance with rules giving priority to the information stored in the queue of the active lines, whereby unprocessed information derived from a plurality of scans can be buffered and processed in an orderly manner.

2. The method according to claim 1 characterized in that the lines at rest are classified into the idle line class and in that an idle line is classified into the active line class when the information relating to an application of voltage corresponding to an off-hook condition of that line has been processed.

3. The method according to claim 1 characterized in that a change of state information contained in the queue of the idle lines is taken into account for processing only if the queue of the active line is free of any change-of-state information.

4. The method according to claim 2 characterized in that a change of state information contained in the queue of the idle lines is taken into account for processing only if the queue of the active lines class is free of any change-of-state information.

5. The method according to claim 1 characterized in that the operation of the exchange center includes active line scanning steps during which the changes of state of active lines are detected and memorized, idle line scanning steps during which the changes of state of idle lines are detected and memorized, and processing steps.

6. The method according to claim 5 characterized in that, during the scanning periods and phases, all the lines are tested, so far as the scanning is carried, but the change-of-state information is transmitted to the appropriate queue by a filtering system which allows passage of only the information concerning the lines of the class to be scanned in the current scanning period or phase, and characterized further in that each scanning period is followed by a scanning phase.

7. Apparatus for collecting and processing information relating to the change of state of active and idle lines provided in an exchange center, including means to test the state of the lines, means to memorize the results of the tests, comparing means to compare the results of the tests with the previously memorized results, storing means to memorize the results of the comparisons, filtering means to transmit the results of the comparisons to the storing means selectively, according to the active-idle status of the lines, control means to control said filtering means, and means to analyse the information recorded in the storing means, characterized by directing means responsive to said control means to act in correspondence with said filtering control means to select the part of storing means to which the results of the comparisons transmitted by filtering means are supplied, at least the part to which the results with regard to active lines are supplied having a plurality of memory positions to enable retention of test results for the same line from plural successive scans, and characterized further by indicator means responsive to full condition of the other part of said storing means.

8. Apparatus in accordance with claim 7, wherein said filtering means comprises a register of old line status, and mask means responsive thereto and operative selectably under the control of said control means to represent active line status or its complement, whereby scan comparison results concerning only active or idle lines are transmitted to said storing means, selectively.

* * * * *